United States Patent [19]

Cain

[11] 3,980,185

[45] Sept. 14, 1976

[54] CARGO CONTAINER INTERLOCK SYSTEM

[76] Inventor: Clyde R. Cain, 75 Half Moon Road, Novato, Calif. 94947

[22] Filed: June 26, 1974

[21] Appl. No.: 483,234

Related U.S. Application Data

[63] Continuation of Ser. No. 386,022, Aug. 6, 1973, abandoned, which is a continuation of Ser. No. 278,928, Aug. 9, 1972, abandoned.

[52] U.S. Cl. ........................ 214/10.5 R; 105/366 E; 214/38 CA; 220/1.5; 294/67 DA

[51] Int. Cl.$^2$ ............................................ B65G 1/14

[58] Field of Search...... 214/38 CA, 38 CC, 10.5 R; 220/1.5, 23.4, 23.6; 294/67 DA, 67 DB; 296/35 A; 105/366 C, 366 E

[56] References Cited

UNITED STATES PATENTS

| | | | |
|---|---|---|---|
| 2,053,969 | 9/1936 | Olds | 296/35 A X |
| 3,014,604 | 12/1961 | Loomis | 214/38 CC X |
| 3,691,595 | 9/1972 | Backteman et al. | 220/1.5 X |
| 3,712,661 | 1/1973 | Strand | 294/67 DA |

*Primary Examiner*—Frank E. Werner
*Attorney, Agent, or Firm*—Naylor, Neal & Uilkema

[57] ABSTRACT

Stackable cargo containers are provided with internal corner assemblies comprising rotatable shaft members which are engaged and turned by the turnable lift members of the conventional lifting crane rig or spreader. With two stacked containers, when the spreader is locked to the top container, the top container is unlocked with respect to the bottom container, and when the spreader is unlocked with respect to the top container the top container is locked to the bottom container.

4 Claims, 9 Drawing Figures

CARGO CONTAINER INTERLOCK SYSTEM

RELATED APPLICATIONS

This application is a continuation of my co-pending application Ser. No. 386,022, filed Aug. 6, 1973 now abandoned, which in turn was a continuation of my application Ser. No. 278,928, filed Aug. 9, 1972, now abandoned.

SUMMARY OF THE INVENTION

The objects of the invention are to provide an automatic container locking system effective to lock and unlock vertically stacked containers with respect to each other or with respect to deck fittings to provide such a container locking system wherein the component parts are disposed within the corners of the containers, to provide a container locking system which is adapted to be compatible with and operable by the conventional spreader to provide a container locking system which is adapted for use with conventional deck fittings for anchoring containers, and to provide containers embodying the container locking system of the invention and also embodying the world standard corner fittings for containers.

These and other objects and advantages of the invention will be apparent from the following description taken in conjunction with the drawings forming part of this specification, and in which.

Figure 1:
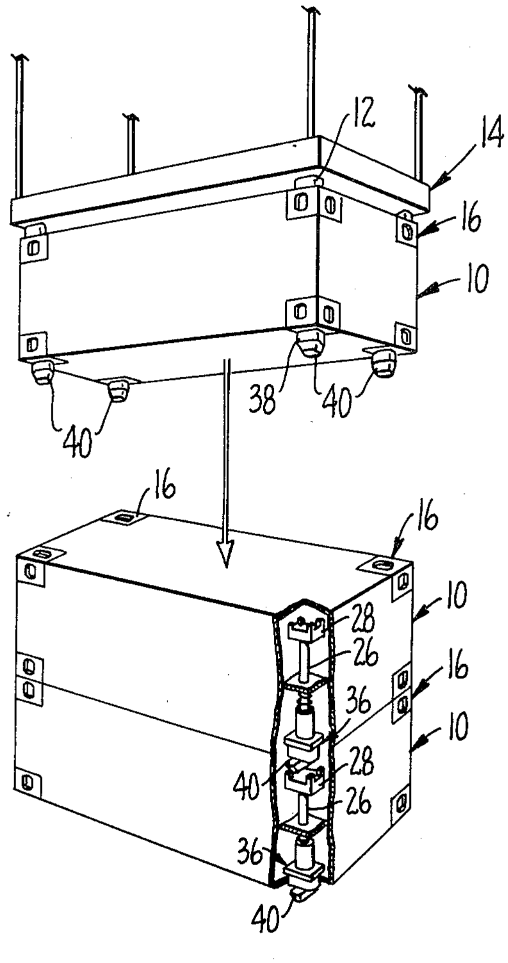
FIG. 1 is a view in perspective showing a spreader carrying a container of the present invention and also showing a pair of stacked and interlocked containers of the present invention.
Figure 2:
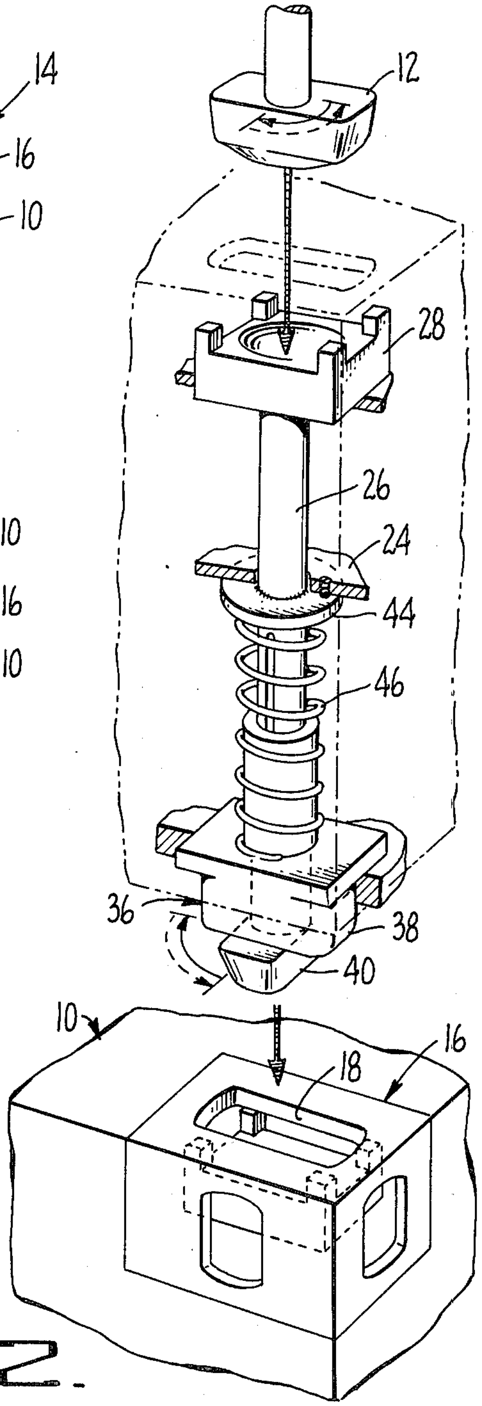
FIG. 2 is an enlarged detail view in perspective of a preferred mechanical arrangement constituting the container locking and unlocking system of the invention.
Figure 3:
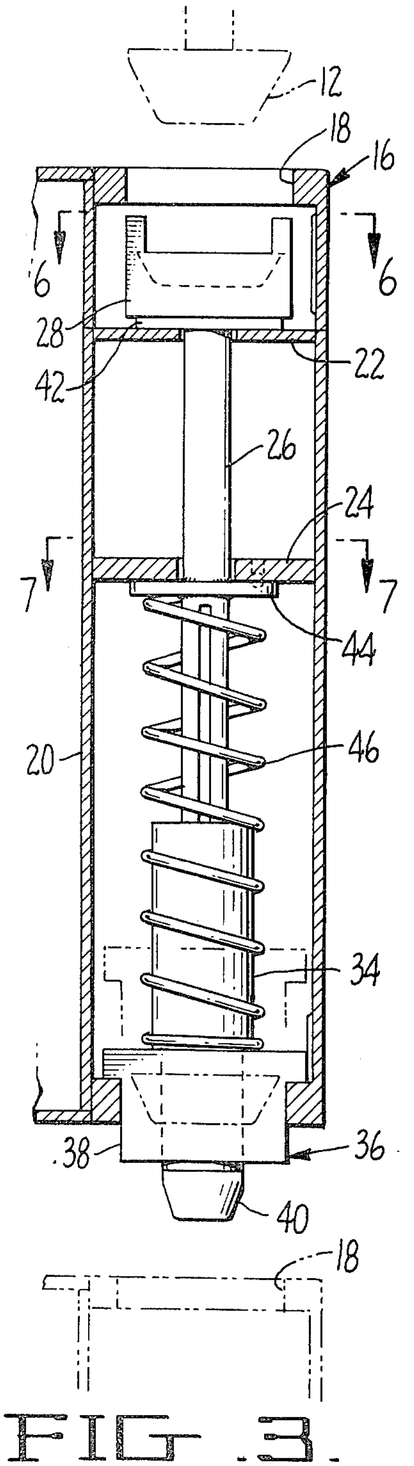
FIG. 3 is a view partially in elevation and partially in section of the corner fitting system of the invention, the rotatable parts being shown in elevation and the stationary or housing parts being shown in section.

Referring to the drawings, FIG. 1 shows a plurality of containers 10 adapted to be stacked and unstacked by the turnable lift members 12 of a lifting crane rig, or spreader, 14. The containers are provided with world standard corner fittings 16 having slots 18 whereby the turnable members 12 of the spreader may be locked into and unlocked from the containers.

Disposed within each of the four corners of each container in association with a pair of corner fittings 16 is the container connector and disconnector system of the invention comprising a tubular housing 20, wall members 22 and 24, a shaft 26 extending through the wall members 22 and 24 having a socketed actuator head 28 at its upper end and having its lower end slidably connected by key and keyway means 30 and 32 to a sleeve 34.

The lower end of the sleeve 34 terminates in a cone member indicated generally at 36. The cone member comprises a foot member 40 secured to the lower end of the sleeve and a bushing-like cylindrical body member 38 which slidably receives the sleeve 34. The body member 38 is shaped to enter and engage the corner slot 18 of a container therebelow to prevent relative lateral movement between stacked containers and, when so engaged, the body member does not rotate. The sleeve 34 and foot member 40 are rotatable relative to the body member 38 and a shoulder 41 on the sleeve 34 engages the body member to prevent the sleeve from being pulled out of the body member when the foot member is in locked position in a slot therebelow.

Each such assembly further comprises a bronze self-lubricating thrust washer 42, plate 44 secured to shaft 26 and adapted to cooperate with ball detent means 45 to maintain the shaft 26 and its associated parts in the desired position of angular orientation, and compression spring 46 operable to normally maintain cone member 36 in extended position.

Figure 4:
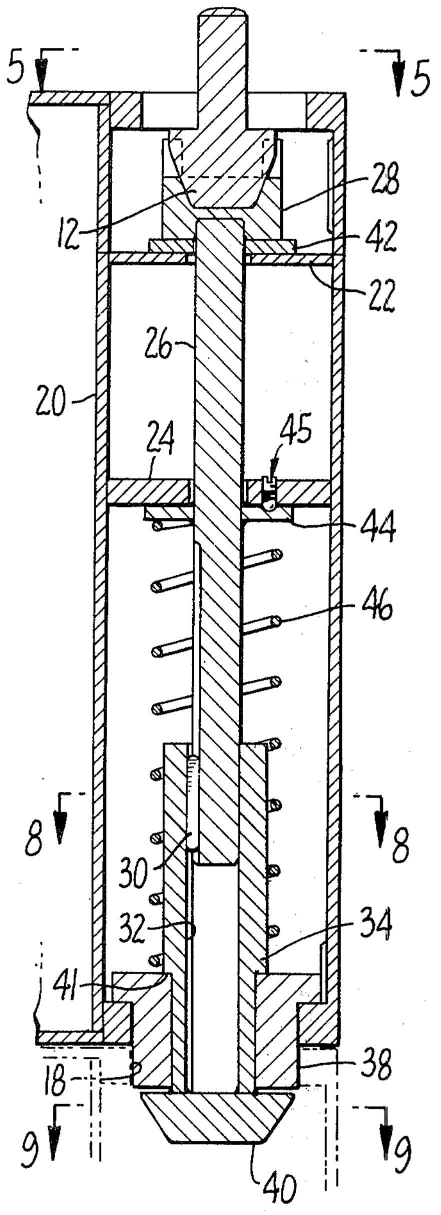
FIG. 4 is a view similar to that of FIG. 3 but showing the rotatable parts also in section and showing them at a 90° offset position with respect to FIG. 3.
Figure 5:
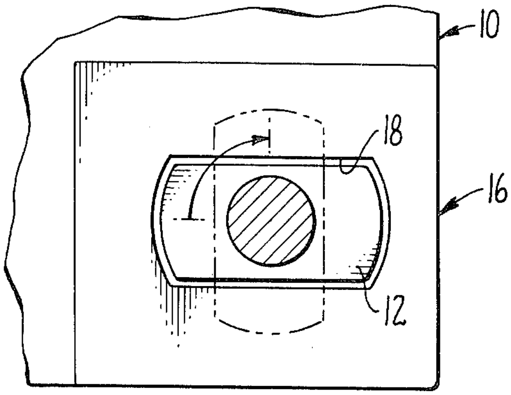
FIG. 5 is a view in section taken along lines 5—5 of FIG. 4.
Figure 6:
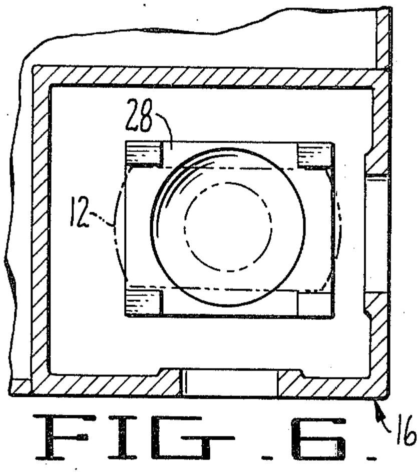
FIG. 6 is a view in section taken along lines 6—6 of FIG. 3.
Figure 7:
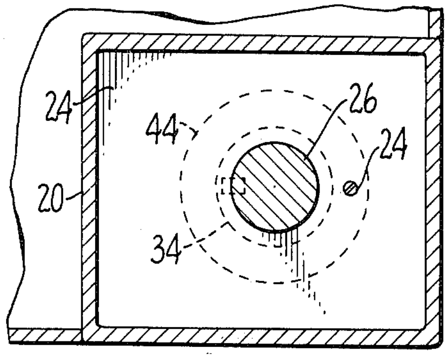
FIG. 7 is a view in section taken along lines 7—7 of FIG. 3.
Figure 8:
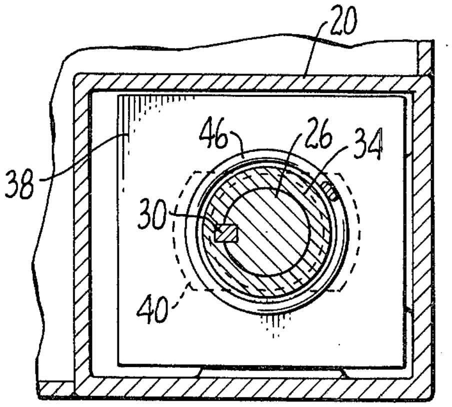
FIG. 8 is a view in section taken along lines 8—8 of FIG. 4.
Figure 9:
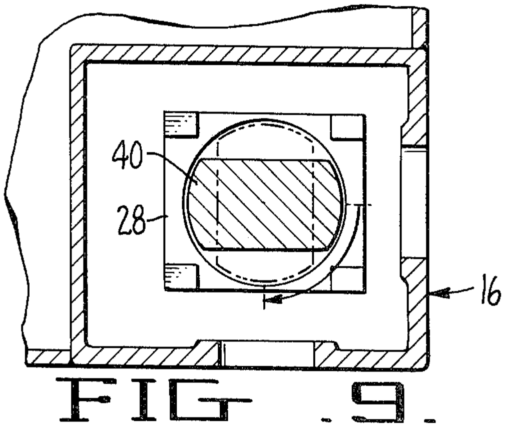
FIG. 9 is a view in section taken along lines 9—9 of FIG. 4.

The long dimension of actuator head member 28 extends to a right angle to the long dimension of foot member 40. When the long dimension of actuator head member 28 is parallel to the long axis of corner fitting slot 18, i.e., when the turntable members 12 of the spreader are in unlocked relation to the upper container, the long dimension of foot member 40 is disposed at a right angle to the long dimension of the corner fitting slot 18 of a second container position immediately below the first container, i.e., the foot member is in locked relation to the second container. Conversely, when the members 12 of the spreader are engaged with the actuator head members 28 and have been turned to an angle of 90° to lock the spreader to the upper container, the foot members 40 of the upper container are disposed in unlocked relation to the second or lower container, as shown in FIG. 4. Thus when the spreader is locked to a container, that container is in unlocked relation to the next lower container, and when the spreader is unlocked with respect to the upper container the upper container is locked to the container directly beneath it.

The foot members 40 of a container do not engage or turn the actuator head members 28 of the container below. The foot members are smaller than the turnable members 12 so as to be rotatable within but not engageable with head members 28. Thus, the members 12 lock with slots 18 and also engage and turn head members 28, while foot members only lock with slots 18.

The sleeve and cone members 34 and 36 are adapted to slide yieldingly upwardly with respect to shaft 26 so as to enable the container to be landed on and secured to protruding cones where such are encountered on ships, rail cars or trailers. The shaft may be employed in non-compressible form when such protruding cones will not be encountered.

What I claim as my invention is:

1. A cargo container having means to connect and disconnect it with respect to turnable members of a spreader and with respect to either slotted corner fittings of another or to slotted deck fittings beneath it, said means comprising a pair of vertically offset upper and lower corner fittings having vertically directed access openings or slots, shaft means extending between the upper and lower fittings and mounted for at least limited rotative movement about its longitudinal axis, actuator means connected to the upper end of the shaft means within the upper fitting adapted to be engaged and rotated by a turnable member of a spreader, and a foot member carried at the lower end of the shaft means adapted to fit within and lock and unlock with slotted corner and slotted deck fittings, the first mentioned actuator means and the foot member being radially offset at an angle of about 90°, such that, when the turnable members of a spreader are locked to a container, said container is unlocked with respect to either the slotted corner fitting of a container therebeneath or a slotted deck fitting, and vice versa.

2. The cargo container of claim 1, the shaft means being comprised of a shaft and a sleeve connected together for sliding movement relative to each other and against rotative movement relative to each other, spring means urging the shaft and sleeve apart, and stop means maintaining the shaft and sleeve together, the shaft means being thereby adapted to be compressibly shortened to dispose said foot member within the lower corner fitting.

3. In a cargo container adapted to be connected and disconnected with respect to turnable members of a spreader and with respect to slotted container or slotted deck fittings, an assembly comprising a pair of vertically offset upper and lower slotted fittings attached to the container, shaft means and means mounting the same between said fittings for rotative movement, a spreader-responsive actuator head within said upper fitting having a connection with the upper end of the shaft means and adapted to rotate the shaft means and to be engaged and rotated by a turnable member of a spreader, and a foot member connected to the shaft means adapted to be rotated by the shaft means and to fit within and lock and unlock with other such upper slotted fittings of other such cargo containers, or with slotted deck fittings, whereby when the turnable member of a spreader is locked within said upper fitting said foot member is unlocked with respect to another such upper slotted fitting of another such container therebeneath, and vice versa.

4. The assembly of claim 3, the shaft means being comprised of a shaft and a sleeve connected together for sliding movement relative to each other and against rotative movement relative to each other, spring means urging the shaft and sleeve apart, and stop means maintaining the shaft and sleeve together, the shaft means being thereby adapted to be compressibly shortened to dispose said foot member within the lower fitting.

* * * * *